No. 656,270. Patented Aug. 21, 1900.
M. P. SCOTT.
COTTON SEED PLANTER.
(Application filed July 14, 1899.)

(No Model.) 4 Sheets—Sheet 1.

Witnesses
J. G. Hinkel
H. A. Hanson.

Inventor
Morse P. Scott
by
Justin F. Freeman
Attorneys

THE NORRIS PETERS CO., PHOTO-LITHO., WASHINGTON, D. C.

No. 656,270. Patented Aug. 21, 1900.
M. P. SCOTT.
COTTON SEED PLANTER.
(Application filed July 14, 1899.)

(No Model.) 4 Sheets—Sheet 4.

UNITED STATES PATENT OFFICE.

MORSE P. SCOTT, OF YONKERS, NEW YORK, ASSIGNOR TO COLIN M. THOMPSON, OF NEW YORK, N. Y.

COTTON-SEED PLANTER.

SPECIFICATION forming part of Letters Patent No. 656,270, dated August 21, 1900.

Application filed July 14, 1899. Serial No. 723,875. (No model.)

*To all whom it may concern:*

Be it known that I, MORSE P. SCOTT, a citizen of the United States, residing at Yonkers, in the county of Westchester and State of New York, have invented certain new and useful Improvements in Cotton-Seed Planters, of which the following is a specification.

This invention relates to certain new and useful improvements in cotton-seed planters, having for its object to provide a machine whereby the seed may be planted uniformly and to any desired depth; and with this object in view the invention consists in the novel features of construction and arrangement and in the combination of the parts hereinafter described.

Figure 1:
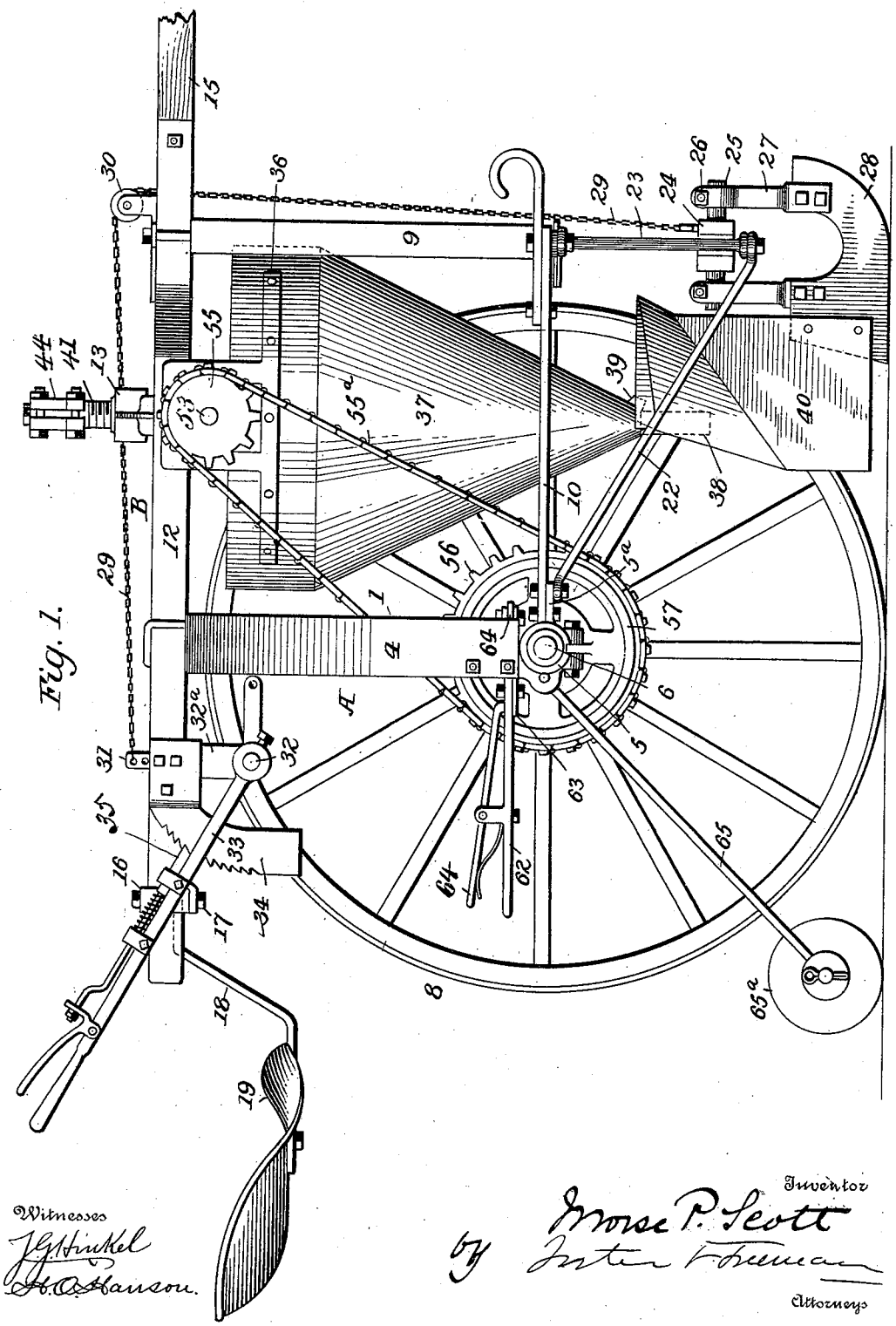
Figure 2:
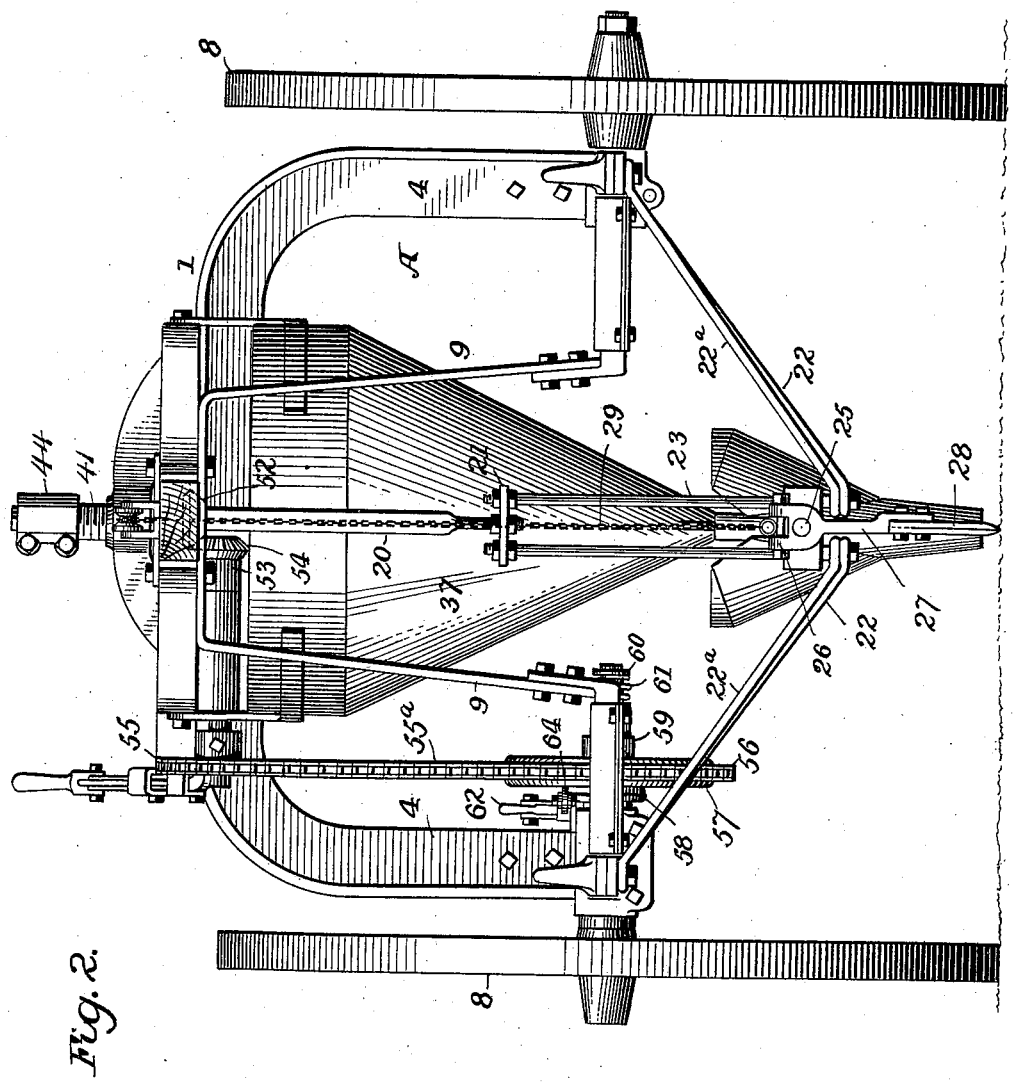
Figure 3:
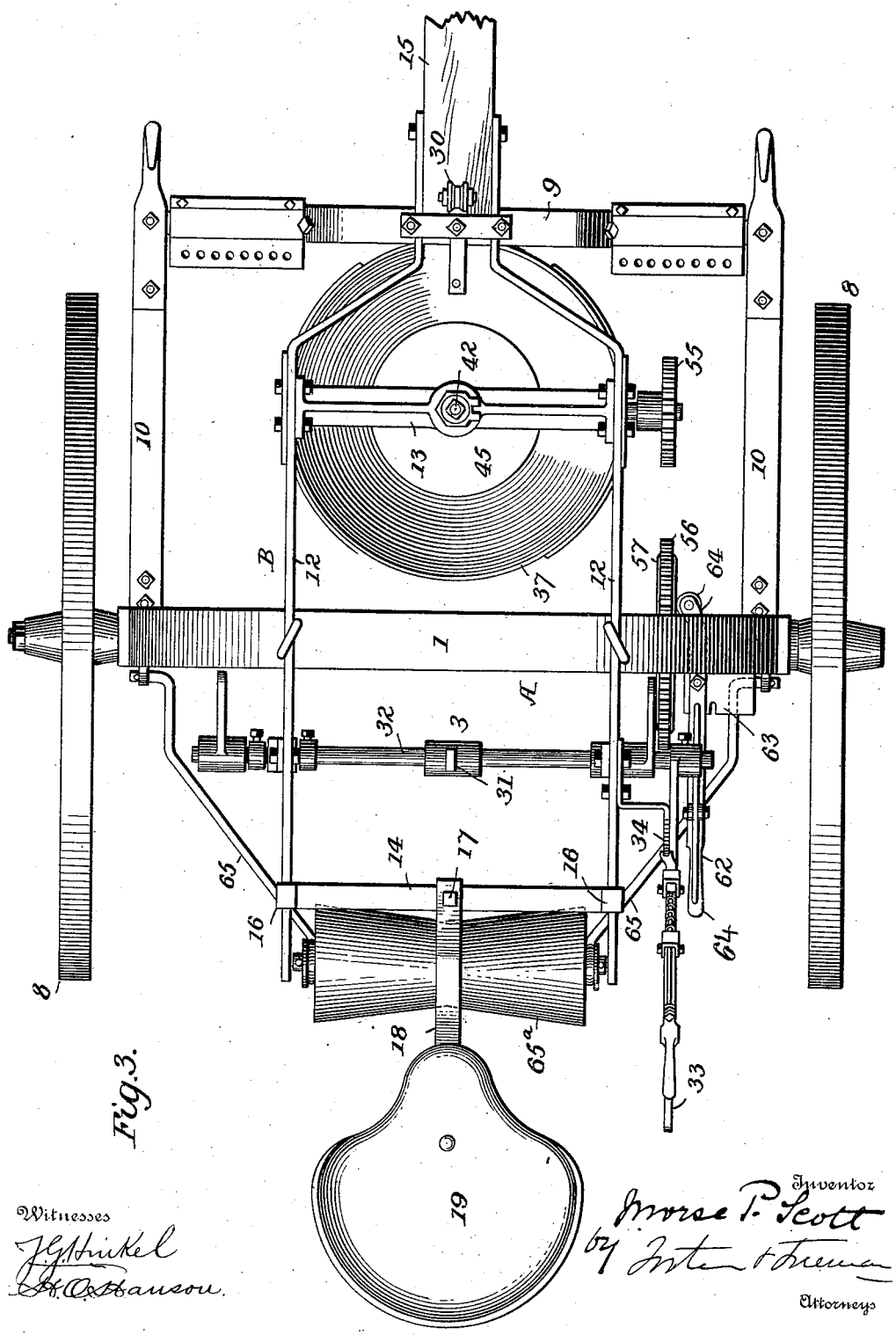
Figure 4:
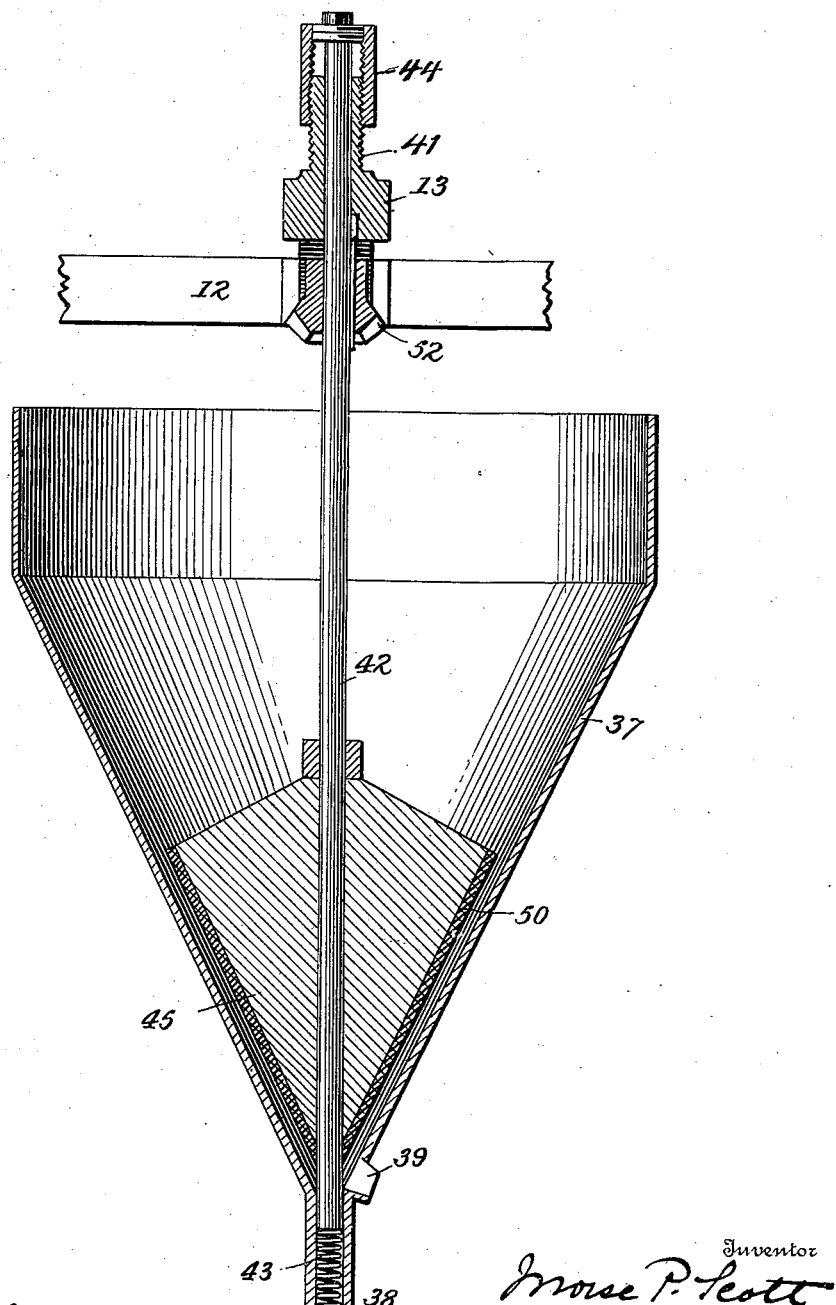

In the accompanying drawings, forming a part of this specification, and in which like characters of reference designate corresponding parts, Figure 1 is a side elevation of a machine embodying the invention. Fig. 2 is a front elevation thereof, and Fig. 3 is a plan view of the same. Fig. 4 is a vertical section through the seed-hopper.

Heretofore it has been extremely difficult to successfully plant cotton-seed automatically—that is to say, to provide a machine which will drop the seed separately and individually—owing to the tendency of the seed to stick or cake together in balls or lumps, caused by the fuzz or short fiber which covers the seed. Accordingly it is one of the principal objects of the present invention to overcome this disadvantage by providing suitable means for separating the seeds before they are dropped into the ground in order that they may be separately discharged from the hopper. It is also desirable, owing to varying conditions, to deposit the seed in the earth at varying depths, and it is another object of the invention to provide effective means whereby this may be accomplished.

Referring more particularly to the drawings, which illustrate a machine forming one embodiment of the invention, A designates the main frame of the machine, comprising an inverted-U-shaped yoke 1, formed, preferably, of metal, parallel side beams 2, connected to the yoke and extending forwardly therefrom, and a cross-beam 3, connecting the side beams near their forward ends. The yoke 1 and beams 2 3 are formed separately and bolted together in any suitable manner. At the lower end of each of the depending parallel arms 4 of the yoke 1 is a journal-box 5, and while said boxes may be cast separately and subsequently bolted or otherwise secured to the arms it is preferred to form them integral with said arms. Extending through the journal-boxes 5 are axle-spindles 6, upon the outer ends of which are mounted the supporting or traction wheels 8. Secured by means of bolts to the under face of the cross-beam 3 are two depending bars 9, which are connected at their lower ends to plates $5^a$, integral with and projecting from the journal-boxes 5 by means of rods 10. Supported upon the yoke 1 and cross-beam 3 is an auxiliary frame B, consisting of two parallel side bars 12, connected together near their forward and rear ends by cross-beams 13 14, respectively, and between the extreme forward ends of the bars 12 of the auxiliary frame is received the rear end of a tongue 15, secured thereto by means of bolts. At the ends of the cross-beam 14 are sockets 16, through which the side bars 12 pass, the sockets permitting the said beam to be adjusted longitudinally of the said side bars 12.

Extending rearwardly from the beam 14 and connected thereto centrally of its length is a bracket 18, upon the end of which is supported a seat 19, adapted to be occupied by the driver or operator, it being secured to said beam by a clamping-nut 17.

Depending from the tongue 15 and secured thereto by means of a bolt is an arm 20, arranged intermediate the bars 9 and supporting a cross-head 21 at its lower end. To the opposite end of this cross-head in turn are adjustably connected two separated guide-rods 23, which extend downwardly therefrom and are arranged parallel to each other, the said rods being secured at their lower ends to the ends of brace-rods 22 and $22^a$, the opposite ends of the rods 22 being connected to the journal-box plates or lugs $5^a$ and the ends of rods $22^a$ being connected to lateral extensions of the beam 9, so that the lower ends of the rods 23 are held rigid in proper relation to the opening-frame. Adapted to slide vertically upon the guide-rods 23 is a block 24, having recesses in its opposite ends into which the guide-rods are received, and extending from opposite faces of the block 24 are projections 25, surrounding which are split clips 26 at the upper ends of arms 27, the said clips being secured against turning upon the projections by means of bolts which pass through separated lugs thereof. At the lower ends of the arms 27 is removably attached an opening-shoe 28, preferably formed with sharpened front and lower edges, the said shoe being adapted to enter the ground when the machine is being drawn thereover to open it up and form a furrow for reception of the seeds.

It is often desirable to plant seeds at different depths, and in order to accomplish this suitable means are provided for elevating and lowering the opening-shoe, and while differently-constructed mechanism may be employed for this purpose that which will now be described is simple and effective and is preferred for this reason. Connected to an eye in the top of the block 24 is a chain or cable 29, which extends upwardly and passes through an opening in the tongue 15, over a pulley 30, journaled in a bracket upon the tongue, and thence rearwardly to an arm 31, to which it is connected. The arm 31 is fixed upon a rock-shaft 32, journaled in brackets 32ª of the auxiliary frame B, and at one side of the machine, in convenient reach of the operator, there is fixedly connected thereto an operating-lever 33. By this arrangement it will be obvious that by rocking the shaft 32, through the lever 33, the arm 31 will be caused to rock, and, through the medium of the cable 29, either lift or lower the block 24 and opening-shoe 28, according to the direction in which the arm is moved. As a convenient means of retaining the opening-shoe in its adjusted position a segmental ratchet-bar 34 is attached to one of the brackets 32ª adjacent the operating-lever 33, and with the teeth of said bar is adapted to engage a sliding spring-pressed pawl 35, carried in guides upon the lever 33 and adapted to be lifted by means of a handle pivotally supported upon the lever and connected to the pawl.

Supported upon depending brackets 36 of the auxiliary frame-bars 12 is a seed-hopper 37, preferably in the form of an inverted cone, as shown, although it might in some instances be in the form of a cylinder, and at the lower end the said hopper is provided with a hollow casting 38, arranged centrally thereof, and at one side directly in the rear of the opening-shoe 28 is formed a discharge opening 39. In order to insure the seed being deposited in the furrow formed by the opening-shoe, there is arranged upon opposite sides of the rear end of the shoe and of the discharge-opening downwardly-converging plates 40, which extend in close proximity to the ground and serve to direct the seed discharged from the hopper directly into the furrow.

Extending centrally through the hopper and through an externally-threaded journal-box 41, supported upon the cross-beam 13, is a vertically-adjustable shaft 42, the lower end of which projects into the chamber of the casting 38 and bears upon a spring 43, located within said chamber, the tendency of which is to move the shaft 42 upward. The extreme upper end of the shaft 42 is received in a split sleeve or cap-piece 44, adapted to screw upon the journal-box 41 and force the shaft downwardly against the stress of the spring 43. Fixedly mounted upon the shaft 42, near its lower end, is a separating-roller 45, in the form of an inverted cone, the walls of which are in close proximity to those of the hopper and are parallel or substantially parallel thereto. This inner cone-shaped roller is adapted to be rotated within the hopper, and in practice as the seed from above fall on or are drawn between the surfaces of the separating-roll and hopper they are separated, should they be clinging or massed together, and the fuzz or lint upon each individual seed is pressed or wrapped closely around the body thereof. By this means when the seed are brought in front of the opening 39 they will be thoroughly separated and there will be no tendency for them to cling together, in consequence of which they may be discharged separately through said opening. It of course will be obvious that by forming the hopper and separating-roller in the shape of inverted cones there is a natural tendency to carry the seed received between them downwardly toward the discharge-opening. Cotton-seeds very often vary in size, and in order that all liability to crush seed of large size when the parts are adjusted to accommodate smaller seed the inner walls of the hopper and exterior surface of the separating-roll are provided with coverings 50, of elastic material, such as rubber of suitable thickness, the said coverings being adapted to yield and accommodate seeds of different sizes without crushing the same. The separating-roller, as shown in the drawings, is rotatable, and as a simple and convenient means of imparting rotary movement to the shaft 42 and separating-roller there is mounted upon the shaft, near its upper end, a bevel-gear 52. The said gear is secured to the shaft by means of a spline, which permits longitudinal movement of the shaft independent thereof, but secures the shaft and gear against independent rotary movement. Mounted in journals of the beam 13 is a shaft 53, upon one end of which is a bevel-gear 54, intermeshing with the gear 52, the opposite end of the shaft being provided with a fixed sprocket-wheel 55. Adapted to rotate loosely upon the inner projecting portion of one of the axle-spindles 6 is a second sprocket-wheel 56, connected to the wheel 55 by means of a chain 55ª, and said second sprocket-wheel is provided at one side with a clutch member 57, adapted to engage with a complemental member 58, fixedly connected to the axle-spindle to rotate therewith. Upon the opposite side from that upon which the clutch is located the sprocket-wheel 56 is formed with a collar 59, between the end of which and an annular flange 60 at the end of the axle-spindle is interposed a spring 61, which surrounds the spindle and normally tends to move the sprocket upon the axle-spindle and bring the clutch members 57 58 into engagement. By the above-described construction it will be obvious that when the sprocket-wheel 56 is connected to the axle-spindle rotary motion will be imparted to the shaft 53 and through the gears 52 and 54 to the shaft 42 and separating-roller 45.

Suitable means are provided for disengaging the clutch member of the sprocket-wheel 56 from the fixed member 58 and for holding said members out of engagement to disconnect the sprocket-wheel from the axle. As shown, said means comprises a lever 62, pivoted intermediate its ends to a notched plate 63, bolted to and projecting horizontally at an angle from one side of one of the yoke-arms. At one end the lever 62 is provided with a friction-roller 64, which is adapted to engage one side of the sprocket-wheel and shift it upon the axle-spindle against the stress of the spring 61 when the lever is swung upon its pivot in the proper direction. Pivoted to the lever 62 is a second or spring-pressed locking-lever 64, the end of which is bent downwardly and adapted to pass through an opening in the lever 62 and engage with the notches of the plate 63 to hold the lever in any position to which it is adjusted.

Pivotally connected to projecting lugs of the journal-boxes 5 are rearwardly-extending rods 65, provided at their lower ends with eyes which receive the projecting ends of the axle of a covering-roller 65ª, the said roller being arranged to travel in line with the opening-shoe and seed-hopper, and the exterior surface of the roller is inclined from end to end toward the center thereof to form a circumferential depression. By thus forming the exterior surface of the roller its oppositely-inclined portions traveling over the earth thrown up upon each side of the furrow tend to force it into the furrow, and thereby effectively cover the seed which have been discharged from the hopper.

It will be observed that the seed-hopper is arranged at the front of the machine, while the covering-roller is carried at the rear thereof, and by thus disposing said parts considerable space is left between them, which allows ample time for the operator to observe whether the seed is being properly dropped from the hopper before the furrow is closed and the seed thereby covered.

Without limiting myself to the precise construction and arrangement of the parts shown and described, since it will be obvious that various changes in the construction and arrangement of the parts may be made without departing from the spirit or scope of the invention, what I claim is—

1. In a cotton-seed planter, the combination of furrow-forming means, a hopper for containing seed, in the rear and in alinement with the furrow-forming means, and means for rolling the seed prior to discharging them from the hopper, substantially as described.

2. In a cotton-seed planter, the combination of furrow-forming means, a hopper for containing seed, having a discharge-opening in alinement with the furrow-forming means, a roller mounted within the hopper, and means for imparting rotation to the roller during movement of the machine to roll the seed prior to discharging them from the hopper, substantially as described.

3. A cotton-seed planter comprising furrow-forming means and means in alinement with the furrow-forming means for subjecting the seed to a rolling action prior to their discharge from the machine into the furrow, substantially as described.

4. In a cotton-seed planter, the combination with an inverted-cone-shaped hopper having a discharge-opening at the lower end of the hopper, an inverted-cone-shaped roller within the hopper, and means for rotating said roller relative to the hopper, substantially as described.

5. In a cotton-seed planter, the combination of furrow-forming means, an inverted-cone-shaped hopper having a discharge-opening at its lower end in alinement with the furrow-forming means, an inverted-cone-shaped roller within the hopper, means for adjusting the roller relative to the hopper to vary the space between their surfaces, and means for rotating the roller, substantially as described.

6. In a cotton-seed planter, the combination of furrow-forming means, a hopper having a discharge-opening arranged rearwardly of and in alinement with the furrow-forming means, said hopper being provided with a yielding lining, a roller within the hopper having a yielding covering, and means for rotating the roller, substantially as described.

In testimony whereof I have signed my name to this specification in the presence of two subscribing witnesses.

MORSE P. SCOTT.

Witnesses:
ARTHUR A. FISHER,
W. C. DUVALL.